United States Patent [19]

Rouet et al.

[11] Patent Number: 5,130,110
[45] Date of Patent: Jul. 14, 1992

[54] PROCESS FOR OBTAINING REFRACTORY METAL OXIDES BASED ON SILICA BY SOL-GEL ROUTE IN AQUEOUS MEDIUM

[75] Inventors: Patrice Rouet, Trosly Breuil; Florence Syoen, Maignelay-Montigny, both of France

[73] Assignee: Societe Francaise Hoechst, Puteaux, France

[21] Appl. No.: 629,767

[22] Filed: Dec. 18, 1990

[30] Foreign Application Priority Data

Dec. 18, 1989 [FR] France ............... 89 16710

[51] Int. Cl.⁵ .................................. C01B 33/28
[52] U.S. Cl. .......................... 423/329; 423/333; 423/338; 501/12; 501/133
[58] Field of Search ............ 423/329, 333, 338; 501/12, 133

[56] References Cited

U.S. PATENT DOCUMENTS

| | | | |
|---|---|---|---|
| H,626 | 4/1989 | Covino | 501/133 |
| 3,929,439 | 12/1975 | Pierce | 423/332 |
| 4,631,158 | 12/1986 | Rieck et al. | 501/80 |

FOREIGN PATENT DOCUMENTS 1952575  9/1970  Fed. Rep. of Germany

OTHER PUBLICATIONS

Chemical abstracts, vol. 110, no. 2, Jan. 9, 1989, pg. 265, abrege no. 124432, Columbus, Ohio, USA; & JP-A-63166714 (Kyoritsu Ceramic Materials Co., Lts.) Sept. 7, 1988.

*Primary Examiner*—Olik Chaudhuri
*Assistant Examiner*—Andrew Griffis
*Attorney, Agent, or Firm*—Browdy and Neimark

[57] ABSTRACT

Process for obtaining by sol-gel route refractory metal oxides based on silica in which a monolithic gel is prepared, in an aqueous medium, at a temperature of less than 60° C., by leaving at rest an aqueous sol obtained by simple mixing in stoichiometric quantities of an aqueous sol of silicic acid and of one or more aqueous solutions of a water-soluble salt of one or more other constitutive metals of these oxides, then the monolithic gel obtained is calcined at a temperature of less than 1000° C. after it has been dried at a temperature of less than 150° C.

4 Claims, No Drawings

PROCESS FOR OBTAINING REFRACTORY METAL OXIDES BASED ON SILICA BY SOL-GEL ROUTE IN AQUEOUS MEDIUM

The present invention relates to a process for obtaining refractory metal oxides based on silica by sol-gel route in aqueous medium.

Ceramics and notably refractory metal oxides based on silica, such as mullite, cordierite or zircon are experiencing an important development in various domains such as the automobile industry, precision casting, catalysis, electronics.

The refractory metal oxides are currently obtained by dry route, by simple heating in a controlled atmosphere at high temperatures, generally at temperatures higher than 1000° C., of a mixture of their constituents in suitable proportions usually in the oxide state. For certain special refractory metal oxides a process by sol-gel route in an organic medium is resorted to. However, even after careful calcination, the products resulting from this process contain traces of carbonated products which make them unfit for use in certain high-tech applications such as electronics or catalysis (European Patent Application No. 237,253, French Patent Application No. 2,598,143).

In order to obviate these disadvantages on the one hand, and to make available an energy efficient process on the other hand, the Applicant has discovered a new process for obtaining refractory metal oxides based on silica by sol-gel route. This process is characterized in that in an aqueous medium, at a temperature of less than 60° C., a monolithic gel is prepared by leaving at rest an aqueous sol obtained by simple mixing in stoichiometric quantities of an aqueous sol of silicic acid and of one or more aqueous solutions of a water-soluble salt of one or more other constitutive metals of these oxides, then the monolithic gel obtained is calcined at a temperature of less than 1000° C. after it has been dried at a temperature of less than 150° C.

By aqueous sol of silicic acid there is designated acid sols of silica such as can be obtained, for example, by the passage of an aqueous solution of an alkali metal silicate over a bed of cation-exchange resins in acid form (as described, for example, by R. K. Iler in The Colloid Chemistry of Silica and Silicates, pages 93–95, Cornell University Press, New York, 1955).

The water-soluble metal salts are advantageously metal salts of nitric acid such as aluminium nitrate, magnesium nitrate, zirconyl nitrate. These water-soluble salts are used in the form of aqueous solutions.

According to the process of the present invention, there are mixed at a temperature of less than 60° C., advantageously at ambient temperature, stoichiometric quantities of silica in the form of an acid aqueous sol of silica and other constituents of these refractory oxides in aqueous solution in water-soluble salt state, then the colloidal aqueous suspension obtained is left at rest at a temperature of less than 60° C. until a monolithic gel is obtained, which takes about two to four hours. This monolithic gel is then dried at a temperature of less than 150° C. so as to eliminate most of the water present and the acid formed and finally it is calcined at a temperature of less than 1000° C.

The following examples illustrate the present invention without however limiting it.

EXAMPLES

An aqueous solution of aluminium nitrate is prepared, designated A, by dissolving 375.13 g (1 mole) of aluminium nitrate crystallized with 9 molecules of water in 624.87 g of water. This solution contains 1 mmole of aluminium nitrate per gram.

An aqueous solution of magnesium nitrate is prepared, designated B, by dissolving 512.8 g (2 moles) of magnesium nitrate crystallized with 6 molecules of water in 487.2 g of water. This solution contains 2 mmoles of magnesium nitrate per gram.

An aqueous solution of zirconium nitrate is prepared, designated C, by dissolving 267.26 g (1 mole) of zirconyl nitrate crystallized with 2 molecules of water in 732.74 g of water. This solution C contains 1 mmole of zircon per gram.

An aquasol at 6% by weight of silica is prepared by the passage of an aqueous solution of sodium silicate over a bed of cation-exchange resin in acid form according to a process similar to that described by Bird in the U.S. Pat. No. 2,244,325. One hundred liters (141 Kg) of an aqueous solution of commercial sodium silicate containing 29.5% silica, 9.3% $Na_2O$ and 61.2% water by weight (density 1.41) and 552 liters of water are mixed together in ambient temperature. This solution is then percolated through a bed of 850 Kg of cation exchanging sulfonic resin in acid form, with a speed of 4 l/mm/0.1 m². This aqueous sol of colloidal silica containing 6% of silica and less than 0.05% of $Na_2O$ by weight has a pH of 2.2. This solution, designated S, contains 1 mmole of silica per gram.

EXAMPLE 1

Preparation of a Mullite-type Phase of $Al_2O_3$-$SiO_2$ Composition 200 g of solution A and 100 g of solution S are mixed together at ambient temperature, then the reaction mixture is heated at 50° C. until a monolithic gel is obtained, which requires about 3 hours of heating. This gel is then heated for 12 hours at 140° C., then it is calcined at 990° C. for 2 hours. In this way 16 g (0.1 mole) of a white powder of formula $Al_2O_3$-$SiO_2$ is obtained, of which the X-ray diffraction pattern is identical to that of mullite.

EXAMPLE 2

Preparation of Mullite

The operation is carried out as in Example 1 starting with 300 g of solution A and 100 g of solution S. In this way 21 g (50 mmoles) of a white powder of formula $3Al_2O_3$, $2SiO_2$ is obtained, of which the X-ray diffraction pattern is identical to that of mullite.

EXAMPLE 3:

Preparation of Cordierite

The operation is carried out as in Example 1 starting with 80 g of solution A, 20 g of solution B and 100 g of solution S. In this way 11.6 g (20 mmoles) of a white powder of formula $2Al_2O_3$, $2MgO$, $5SiO_2$ is obtained, of which the X-ray diffraction pattern is identical to that of cordierite.

EXAMPLE 4

Preparation of Zircon

The operation is carried out as in Example 1 starting with 100 g of solution C and 100 g of solution S. In this way 18.3 g (0.1 mole) of a white powder of formula $ZrO_2$, $SiO_2$ is obtained, of which the X-ray diffraction pattern is identical to that of zircon.

We claim:

1. Process for obtaining by sol-gel route refractory metal oxides based on silica, characterized in that a monolithic gel is prepared, in an aqueous medium, at a temperature of less than 60° C., by leaving at rest an aqueous sol obtained by simple mixing in stoichiometric quantities of an aqueous sol of silicic acid and of one or more aqueous solutions of a water-soluble salt of one or more other constitutive metals of these refractory metal oxides, then the monolithic gel obtained is calcined at a temperature of less than 1000° C. after it has been dried at a temperature of less than 150° C.

2. A process for producing a silica-containing refractory metal oxide comprising:

preparing an aqueous sol of silicic acid, preparing one or more aqueous solutions of water-soluble salts of metals;

mixing a stoichiometric quantity of said aqueous sol of silicic acid and one or more aqueous solutions of said water soluble salts of metals to provide a mixture thereof;

allowing the mixture to gel at a temperature of less than about 60° C., drying said gel at a temperature of less than about 150° C. and calcining said gel at a temperature of less than about 1000° C. to provide said silica-containing refractory oxide.

3. The process of claim 2 wherein at least one of said metals is selected from the group consisting of aluminum, magnesium and zirconium.

4. The process of claim 2 wherein said water soluble salts of metals are nitrates.

* * * * *